US010024205B2

(12) United States Patent
Knecht

(10) Patent No.: US 10,024,205 B2
(45) Date of Patent: Jul. 17, 2018

(54) HYDRAULIC VALVE FOR THE CAM PHASER

(71) Applicant: ECO Holding 1 GmbH, Marktheidenfeld (DE)

(72) Inventor: Andreas Knecht, Tuebingen (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/361,389

(22) Filed: Nov. 26, 2016

(65) Prior Publication Data

US 2017/0130622 A1    May 11, 2017

Related U.S. Application Data

(63) Continuation of application No. PCT/EP2015/066285, filed on Jul. 16, 2015.

(30) Foreign Application Priority Data

Jul. 30, 2014   (DE) .................. 10 2014 011 088

(51) Int. Cl.
*F01L 1/344* (2006.01)
*F16K 31/06* (2006.01)
*F01L 1/34* (2006.01)

(52) U.S. Cl.
CPC .............. *F01L 1/3442* (2013.01); *F01L 1/34* (2013.01); *F01L 1/344* (2013.01); *F16K 31/0613* (2013.01); *F01L 2001/3443* (2013.01); *F01L 2001/34426* (2013.01); *F01L 2001/34479* (2013.01); *Y10T 137/86622* (2015.04)

(58) Field of Classification Search
CPC combination set(s) only.
See application file for complete search history.

(56) References Cited

U.S. PATENT DOCUMENTS

| 2,853,659 A | 5/1972 | Herion |
| 6,202,699 B1 | 3/2001 | Meyer et al. |
| 6,498,416 B1 | 12/2002 | Oishi et al. |
| 2008/0164434 A1 | 7/2008 | Iwa et al. |

FOREIGN PATENT DOCUMENTS

| DE | 102004036096 | 3/2006 |
| DE | 102007012967 B4 | 9/2008 |
| DE | 102009022869 | 12/2010 |
| DE | 102009043320 | 4/2011 |
| DE | 102010061219.7 | 6/2012 |
| EP | 2568204 A1 | 3/2013 |
| WO | WO2016016012 | 7/2015 |

*Primary Examiner* — Mark Laurenzi
*Assistant Examiner* — Wesley Harris
(74) *Attorney, Agent, or Firm* — Von Rohrscheidt Patents

(57) ABSTRACT

The invention relates to a hydraulic valve for phaser. In the hydraulic valve according to the invention a seal element is arranged so that a risk of a transition of oil from an oil cycle or a lubricant cycle of an internal combustion engine or a risk of hydraulic fluid from the hydraulic valve entering a coil of an actuator is avoided.

13 Claims, 3 Drawing Sheets

HYDRAULIC VALVE FOR THE CAM PHASER

RELATED APPLICATIONS

This application claims priority from and incorporates by reference International Patent Application PCT/EP2015/066285 filed on Jul. 16, 2015 claiming priority from German Patent Application DE 10 2014 011 088.5 filed on Jul. 30, 2014.

FIELD OF THE INVENTION

The invention relates to a hydraulic valve for a cam phaser according to the preamble of patent claim 1.

BACKGROUND OF THE INVENTION

DE10 2009 022 869 already discloses a hydraulic valve for a cam phaser. This hydraulic valve includes a piston that is supported longitudinally movable along an inner running surface for distributing hydraulic fluid from a supply connection P to two adjacent operating connections A, B. The piston is longitudinally moveable by an electro magnetically actuatable actuator. The tank connection T is provided in an axial direction.

DE10 2004 036 096 A1 shows a hydraulic valve in which the connection P-T-B-A are radially arranged.

BRIEF SUMMARY OF THE INVENTION

It is an object of the invention to provide a robust hydraulic valve for a cam phaser.

The object is achieved according to the invention by a hydraulic valve for a phaser of a cam shaft, the phaser including a piston that is supported axially movable along a first inner running surface of a hydraulic bushing of the hydraulic valve and configured to distribute a hydraulic fluid from a supply connection to a first operating connection and a second operating connection that are arranged adjacent to each other, wherein the piston is axially movable by an electromagnetically actuatable actuator, wherein the electromagnetically actuatable actuator includes a hollow pole element which is configured to receive an armature that is axially movable in the hollow pole element, wherein a coil of the actuator envelops the hollow pole element at least partially so that applying a voltage to the coil causes a magnetic field to move the armature in the actuator, wherein the hydraulic bushing that is flowable by the hydraulic fluid is at least configured adjacent to the hollow pole element, wherein the hollow pole element has a reduced outer diameter in a portion of the coil so that the hollow pole element is configured as a pole core cone starting from the reduced outer diameter in a direction towards the hydraulic bushing and the hollow pole element is configured as a pole yoke in a direction oriented away from the hydraulic bushing, wherein the hydraulic bushing is received in a bore hole of a valve housing of the hydraulic valve, wherein the pole core cone includes a seal element in an end portion oriented towards the hydraulic bushing, which seal element seals the bore hole relative to the coil.

Advantageous embodiments with useful and non-trivial improvements of the invention are defined by the respective independent claims.

In the hydraulic valve according to the invention a pole element is configured to develop a magnetic field when a voltage is applied at a coil received in an actuator of the hydraulic valve which facilitates in a simple manner to magnetically separate a pole core cone and a pole yoke of the actuator. Thus, the pole element includes an exterior diameter contraction in the portion of the coil so that the pole yoke and the pole core cone are configured in one piece as a pole element while maintaining a functional required separation between the pole yoke and the pole core cone due to the exterior diameter contraction. Through a thin remaining connection bar the magnetic field can hardly be conducted to maintain the function. In another context diameter reductions are disclosed in U.S. Pat. No. 2,853,659, U.S. Pat. No. 6,498,416 B1 and JP57164371U.

A sealing of the actuator, in particular of the coil relative to the hydraulic fluid of the hydraulic valve or of the hydraulic fluid in an armature carrying portion of the pole element is obtained by a seal element. Thus, the seal element is arranged in a portion of an end of the pole core cone oriented towards the hydraulic bushing. Advantageously the seal element is configured in the form of a typical O-ring. Thus, a sealing in particular of the coil relative to a possible penetration of hydraulic fluid is implemented in combination with a simple configuration of the pole element. Furthermore when a portion of the actuator including the pole element is in a portion of the internal combustion engine that is proximal to engine oil a safe separation of engine oil and hydraulic fluid is provided.

The seal element is advantageously positioned at an enveloping surface of the pole core cone which is arranged oriented towards the valve housing. For a secure reception and positioning of the seal element the pole core cone includes an annular groove. The annular groove is configured at the enveloping surface along the circumference of the pole core cone. Alternatively the seal element can also be arranged in an annular groove.

In another embodiment the pole core cone is receivable in the hydraulic bushing. This has the advantage that an essentially closed hydraulic valve can be provided so that an oil cycle or lubricant cycle of an internal combustion engine is separated from the oil which is provided within the electromagnetic actuator or partially within the hydraulic portion.

Thus, the pole core cone is thus configured hollow cylindrical where it is oriented away from its conical point so that the hydraulic bushing is insertable into the pole core cone which implements a press fit between the pole core cone and the hydraulic bushing to provide a particularly tight and stable connection.

The hydraulic bushing is made from an aluminum material. This has the advantage that the hydraulic bushing can be machined easily and the hydraulic bushing has the same thermal expansion coefficient as the valve housing into which the hydraulic bushing is inserted. The pole core cone is made from a ferrous material since the pole core cone has to be able to conduct a magnetic flux in order to be functional and has to be magnetizable.

In order to establish a coaxial alignment between the pole yoke and the pole core cone with a particularly small tolerance the pole yoke and the pole core cone can be integrally fabricated in one piece in a particularly advantageous embodiment and can have a common diameter.

However it is also possible to obtain a uniform continuous inner diameter of the inner running surface with other means. For example the pole yoke and the pole core cone can be made from two components which are welded together by a non-magnetizable weld and which are subsequently drilled with a common inner diameter.

In another embodiment the hydraulic valve is configured so that the oil cycle of the internal combustion engine is separate from the hydraulic fluid of the actuator or the hydraulic bushing. Thus, an inner portion of the hydraulic valve is kept free from contaminants and abrasion particles of the lubricant cycle. A risk that an armature of the electromagnetic actuator that is movably received in the pole element binds due to a solid particle relative to an interior running surface in the pole yoke is decreased. Thus, a tight tolerance between the armature and the inner running surface in the pole yoke is feasible. This tight tolerance improves coaxial alignment errors and thus reduces transversal forces. Namely transversal forces increase with coaxial alignment errors. Using a tight tolerance, however, is only possible when no solid particles can lodge between the armature and the inner running surface. When solid particles bind at this location the armature can only be pulled clear by high magnetic forces. Thus the coil or the electro magnet have to be oversized by a large amount which is disadvantageous for efficiency and which in turn increases the detrimental transversal forces even further. The armature and/or the pole yoke can be provided at their surface with a non-magnetizable layer for separation purposes. Alternatively it is also possible to use a non-magnetizable pot shaped sleeve. Such pot shaped sleeves are disclosed for example in DE 10 2009 043 320 B4 and DE10 2010 061 219.7. An additional alternative for the pot shaped component is a pot shaped pole yoke which is as such already disclosed in U.S. Pat. No. 6,202,699 B1.

In order to achieve a hydraulic separation between the engine oil cycle and the electromagnetic actuator an axial sequence of the connection in the order T1-A-P-B-T2 is advantageous. Thus, it is particularly advantageous that the tank connections T1 and T2 have a lower pressure than the supply connection P and the operating connections A, B so that virtually pressure free tank connections T1 and T2 are arranged between the high pressure portion and the virtually pressure free inner portion of the hydraulic valve wherein the tank connections T1 and T2 run the contaminated engine oil outward to the tank and through the oil filter.

According to an advantageous embodiment of the invention the hydraulic valve of the cam phaser is configured as an external or non-central hydraulic valve, The typical non-central hydraulic valves according to the connection sequence T1-A-P-B-T2 do not have an axial inlet/outlet of oil. Besides the non-central hydraulic valves there are central valves that are radially arranged within the rotor hub of the cam phaser. The invention can also be used as a matter of principle for central valves with some disadvantages.

Since the inner portion for the hydraulic valve according to the invention is free from the oil pressure of the supply connection P, the piston is not exposed to any hydraulic axial forces.

Additional advantages of the invention can be derived from the dependent patent claims, the description and the drawing figures.

BRIEF DESCRIPTION OF THE DRAWINGS

The invention is subsequently described based on two embodiments with reference to drawing figures, wherein.

DETAILED DESCRIPTION OF THE INVENTION

Figure 1:
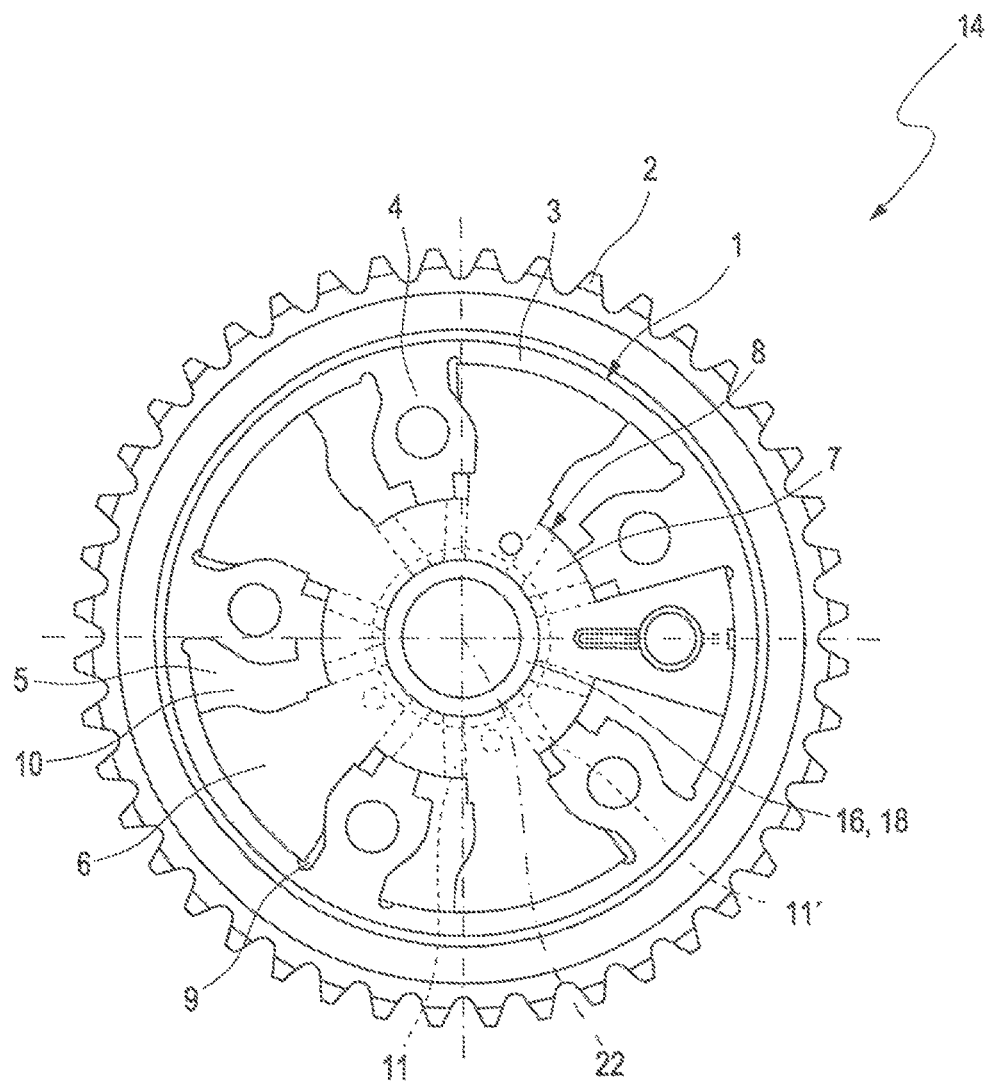
FIG. 1 illustrates a cam phaser in a sectional view.

A cam phaser 14 according to FIG. 1 is used to continuously adjust an angular position of a cam shaft 18 of a non-illustrated internal combustion engine relative to a drive wheel 2 during operation of the internal combustion engine. Rotating the cam shaft 18 moves opening and closing times of gas control valves of the internal combustion engine so that the internal combustion engine develops optimum power at a respective speed.

The cam phaser 14 includes a cylindrical stator 1 which is connected torque proof with the drive wheel 2. In the illustrated embodiment the drive wheel 2 is a chain sprocket over which a chain is run that is not illustrated in more detail. The drive wheel 2 however can also be a timing belt cog over which a timing belt is run as a drive element. Through this drive element and the drive wheel 2 the stator 1 is drive connected with the crank shaft.

The stator 1 includes a cylindrical stator base element 3 from which bars 4 protrude at an inside in a radially inward direction with uniform spacing there between. Between adjacent bars 4 gaps 5 are formed into which a pressure medium is introduced in a controlled manner through a hydraulic valve 12 that is illustrated in more detail in FIG. 2. Thus the hydraulic valve 12 is configured as a non-central hydraulic valve 12. Blades 6 protrude between adjacent bars 4 wherein the blades protrude in a radially outward direction from a cylindrical rotor hub 7 of a rotor 8. The blades 6 divide the intermediary spaces 5 between the bars 4 respectively into two pressure chambers, a first pressure chamber 9 and a second pressure chamber 10.

The bars 4 contact an outer enveloping surface of the rotor hub 7 with their faces in a sealing manner. The blades 6 in turn contact a cylindrical inner wall of the stator base element 3 with their faces in a sealing manner.

The rotor 8 is connected torque proof with the cam shaft 18. In order to adjust an angular position between the cam shaft 18 and the drive wheel 2 the rotor 8 is rotated relative to the stator 1. Thus, depending on a desired direction of rotation the pressure medium in the first pressure chamber 9 or the second pressure chamber 10 is pressurized while a respective other pressure chamber, the second pressure chamber 10 or the first pressure chamber 9 is unloaded towards a tank. In order to pivot the rotor 8 relative to the stator 1 counter clockwise into the illustrated position the hydraulic valve 12 pressurizes an annular first rotor channel 23 in the rotor hub 7. Additional second channels 11 lead from the first rotor channel 23 to the second pressure chambers 10.

The first rotor channel 23 is associated with a first operating connection A of the hydraulic valve 12. In order to pivot the rotor 8 clockwise the hydraulic valve 12 pressurizes a second annular rotor channel 24 in the rotor hub 7. This second rotor channel 24 is associated with a second operating connection B of the hydraulic valve 12. The two rotor channels 23, 24 are arranged axially offset from one another with respect to a central axis 22 of the cam phaser 14. From this second rotor channel 24 additional first channels 11' lead into the first pressure chamber 9.

Figure 2:
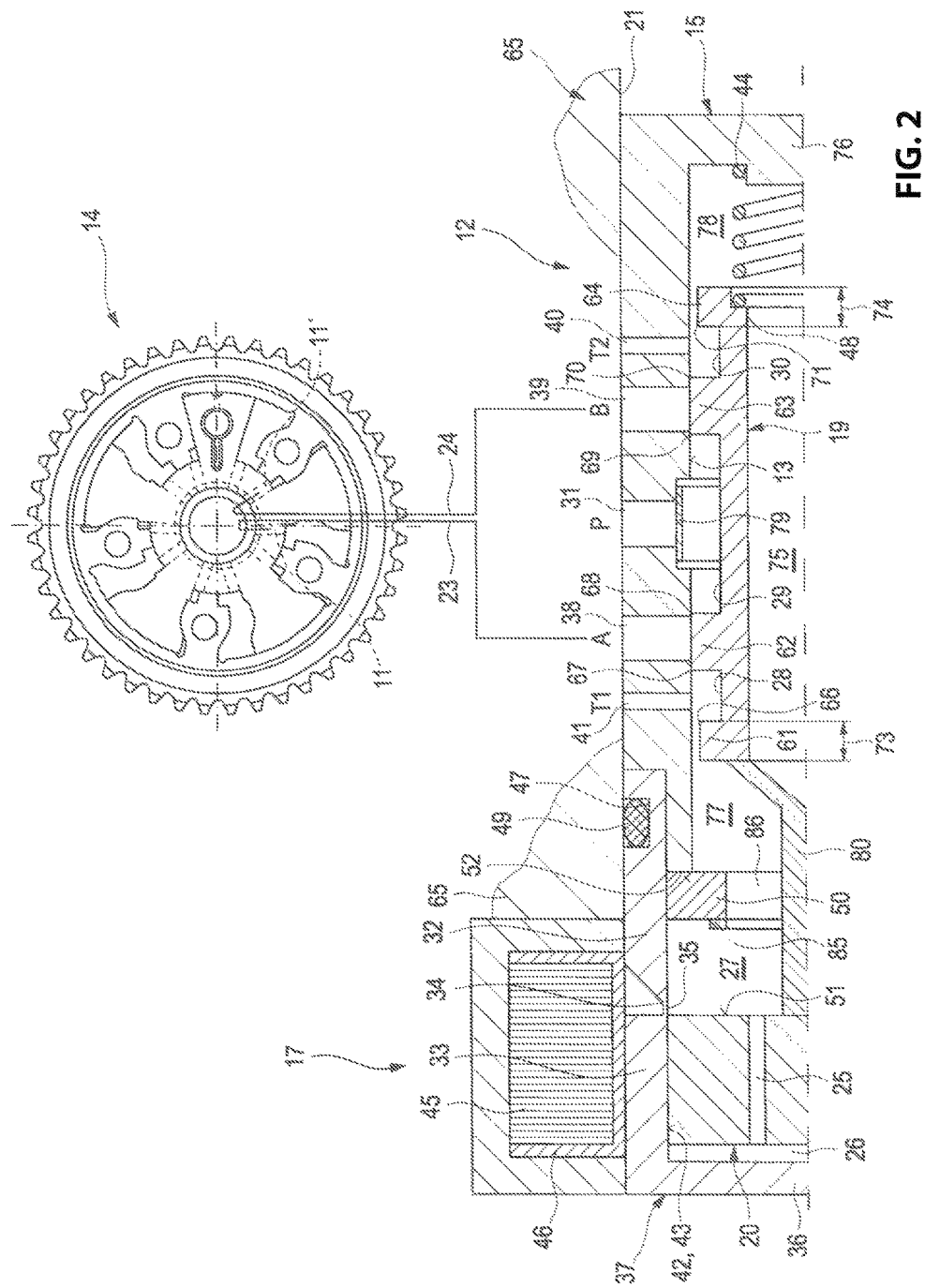
FIG. 2 illustrates a semi-sectional view of a hydraulic valve for adjusting the cam phaser according to FIG. 1.

The cam phaser 14 is applied to the cam shaft 18 that is configured as a hollow tube 16. Thus, the rotor 8 is slid onto the cam shaft 18. The cam phaser 14 is pivotable by the electromagnetically actuated hydraulic valve 12 that is illustrated in FIG. 2.

The electromagnetically actuated hydraulic valve 12 with a valve housing 65 includes an electromagnetic actuator 17 and a hydraulic bushing 15. The hydraulic bushing 15 is configured in a bore hole 21 of the valve housing 65. Within this hydraulic bushing 15 a hollow piston 19 is supported axially movable against a force of a compression coil spring 44 along an inner running surface 13. Thus, the compression coil spring 44 is supported on one side at the piston 19 and on the other side the compression coil spring is supported relative to the housing at the hydraulic bushing 15. A shoulder 48 is provided as a contact for the compression coil spring 44 within the piston 19 wherein a radial spring support adjoins at an end of the piston 19.

An armature 20 of the electromagnetic actuator 17 contacts the piston 19 at an end of the hydraulic bushing 15 that is at an outside of the cam shaft, this means at a rear end of the hydraulic bushing 15.

The hydraulic bushing 15 includes five recesses that are axially offset from each other, a first recess 31, a second recess 38, a third recess 39, a fourth recess 40 and a fifth recess 41. Out of these the four recesses arrange on the axial outside, the fifth recess 41, the second recess 38, the third recess 39 and the fourth recess 40 form the two operating connections A, B and two tank connections T1, T2. The axially centrally located recess, the first recess 31, forms the supply connection P. The supply connection P includes an inner ring groove on an inside of the first recess 31, wherein a band shaped check valve 79 is inserted into the inner ring groove. This total of five recesses 41, 38, 31, 39, 40 cooperates with three control grooves, a first control groove 28, a second control groove 29, and a third control groove 30 which extend circumferentially at an outside of the piston 19.

Thus, so called control edges are formed between the control grooves 28, 29, 30 and the adjacent axially outer recesses 41, 38, 39, 40. These control edges define an amount of the hydraulic fluid that is run through, wherein a flow of hydraulic fluid can be cut off at these control edges almost entirely when the overlap is large enough. When the control edge is blocked a seal gap is formed between the piston 19 and the hydraulic bushing 15.

The fifth recess 41, the second recess 38, the first recess 31, the third recess 39 and the fourth recess 40 are arranged in the sequence T1-A-P-B-T2. Put differently the axial sequence from the first inner running surface is as follows:
the first tank connection T1 for running hydraulic fluid out from the first operating connection A,
the first operating connection A for running hydraulic fluid into the first pressure chamber 9 of the cam phaser 14,
the supply connection P,
the second operating connection B for running hydraulic fluid into the second pressure chamber 10 of the cam phaser 14 which second pressure chamber is oriented opposite to the first pressure chamber 9, and
the second tank connection T2 for running hydraulic fluid out from the second operating connection B.

The two outer recesses, the fifth recess 41 and the fourth recess 40 are associated with the two tank drains T1, T2. The second recess 38 is associated with the first operating connection A and provided for running hydraulic fluid into the second pressure chambers 10 of the cam phaser 14 that are associated with a first phasing direction. Furthermore hydraulic fluid can be pumped to the first tank drain T1 through this first operating connection A.

The third recess 39 that is positioned between the fourth recess 40 associated with the second tank drain T2 and the first recess 31 associated with the supply connection P is associated with the second operating connection B and provided for running hydraulic fluid into the first pressure cavities 9. Furthermore hydraulic fluid can be pumped through this operating connection B from the first pressure cavities 9 to a second tank drain T2.

In order to separate the three control grooves 28, 29, 30 four bars, a first bar 61, a second bar 62, a third bar 63 and a fourth bar 64 are formed at an outside of the piston 19. In the illustrated center blocking position of the piston 19 the two operating connections A, B are loaded with more pressure, than a drain pressure of the hydraulic fluid. Thus, the cam phaser 14 is fixated in this angular position. In this center blocking position the two recesses of the two operating connections A, B are covered by the second bar 62 and the third bar 63.

A third control edge 68 of the second bar 62 and a fourth control edge 69 of the third bar 63 have a smaller overlap than the control edges oriented away from each other, a second control edge 67 of the second bar 62 and a fifth control edge 70 of the third bar 63.

The first control groove 28 and the third control groove 30 are thus defined by first control edge 66 or the sixth control edge 71 towards the operating connections A, B wherein the control edges 66 and 71 are oriented towards each other at the first bar 61 and at the fourth bar 64. The first control groove 28 and the third control groove 30 are defined in an axial outward direction by the bars adjoining the first control edge 66 or the sixth control edge 71, thus by the first bar 61 and the fourth bar 64.

Between the first inner running surface 13 and the first bar 61 or the fourth bar 64 radial gaps are configured over a first gap length 73 and a second gap length 74.

Through these gap lengths 73, 74 thus a limited amount of sealing is provided relative to an inner space 75 within the hollow piston 19.

This inner space 75 within the piston 19 connects two spaces that are arranged axially adjacent to the piston 19, a third space 77 and a fourth space 78. The fourth space 78 that is arranged oriented away from the actuator 17 is hydraulically closed by a closure 76. This closure 76 closes the hydraulic bushing 15 similar to a base of a pot. The third space 77 is closed by a pot shaped component adjoining the first inner running surface 13 wherein the pot shaped component is configured as a pole can 37.

Thus, the entire inner space 75 within the hollow piston 19 and within the pole can 37 is hydraulically separated from the outer control grooves that are only exposed to a low pressure, the first control groove 28 and the third control groove 30 or the tank connections T1, T2 connected thereto. However, the relatively high pressure at the supply connection P is separated by the two axially interior bars, the second bar 62 and the third bar 63 from the exterior control grooves, the first control groove 28 and the third control groove 30. Due to these separations and the low pressure in the axially outer control grooves 28, 30 there is hardly any exchange of hydraulic fluid between a first space 26 arranged axially in front of an armature 20 of the actuator 17 which armature is axially movable within the pole can 37 and a second space 27 formed axially behind the armature 20. Thus, a gap with very tight tolerance between the armature 20 and a second inner running surface 43 of the pole can 37 is kept substantially free from contaminant particles from the engine oil lubrication cycle to which the cam phaser 14 is connected.

The hydraulic bushing 15 is axially fixated at a pole core cone 32 of the pole can 37. Thus, the hydraulic bushing 15 is pressed into the pole core cone 32. The magnetizable pole core cone 32 is fabricated integrally in one piece with a pole yoke 33 of the pole can 37. In order to still provide a functional separation between the pole core cone 32 and the pole yoke 33 the pole core cone 32 tapers at the cone tip 34 into a reduced outer diameter 35. This reduced outer diameter 35 adjoins the pole yoke 33. The pole yoke 33 is configured closed with a base 36. Thus, the pole can 37 whose inside 42 forms the second inner running surface 43 for the armature 20 forms the pole core cone 32, the pole core yoke 33 and the base 36 that is provided with a continuous interior diameter 82.

An electrical coil 45 is provided that radially envelops the pole can 37. This coil 45 is made from a plastic coil carrier 46 to which the wire winding is applied.

The pole can 37 includes an externally circumferential annular groove 47 at an end of the pole can that is oriented towards the hydraulic bushing 15. A seal element 49 configured as an O-ring is inserted into this annular groove 47. The O-ring 49 seals the pole can 37 against the bore hole 21. Thus, hydraulic fluid cannot exit within the bore hole 21 at an opening portion of the bore hole 21 oriented towards the actuator 17. Alternatively the O-ring 49 can also be positioned in an annular groove in the bore hole 21 and can seal in a radial direction at the pole can 37.

The armature 20 includes a pass through bore hole 25 which assures that the hydraulic fluid or a mix of hydraulic fluid and air can be exchanged between the first space 26 and the second space 27. A first face 51 of the armature 20 is oriented towards a second face 52 of the hydraulic bushing 15. A pole core ring 50 is impressed between the faces 51, 52 within in the pole can 37. This pole core ring 50 is magnetizable like the pole core cone 32 and is thus arranged in the magnetic field which is generated when a voltage is applied to the coil 45.

Since the piston 19 includes control grooves that are associated with the tank connections T1, T2 at both ends of the piston, the first control groove 28 and the third control groove 30, the first tank connection T1 and the second tank connection T2 are defined in an axially outward direction by the first bar 61 or the fourth bar 62. Thus, the spaces axially adjoining the first bar 61 and the fourth bar 64, the third space 77 and the fourth space 78 are hydraulically separated from
the first tank connection T1,
the first operating connection A,
the supply connection P
the second operating connection B, and
the second tank connection T2
in any position of the piston.

The piston 19 is provided as a turned component which is supported at the armature 20 by a support element 80. The support element 80 can be configured as a plunger that is alternatively pressed into the piston 19 or into the armature 20, wherein the plunger includes recesses for passing hydraulic fluid between the inner space 75 and the third space 77.

Since the inner portion within the hydraulic valve 12 is free from oil pressure from the supply connection P no hydraulic axial forces impact the piston 19.

Figure 3:
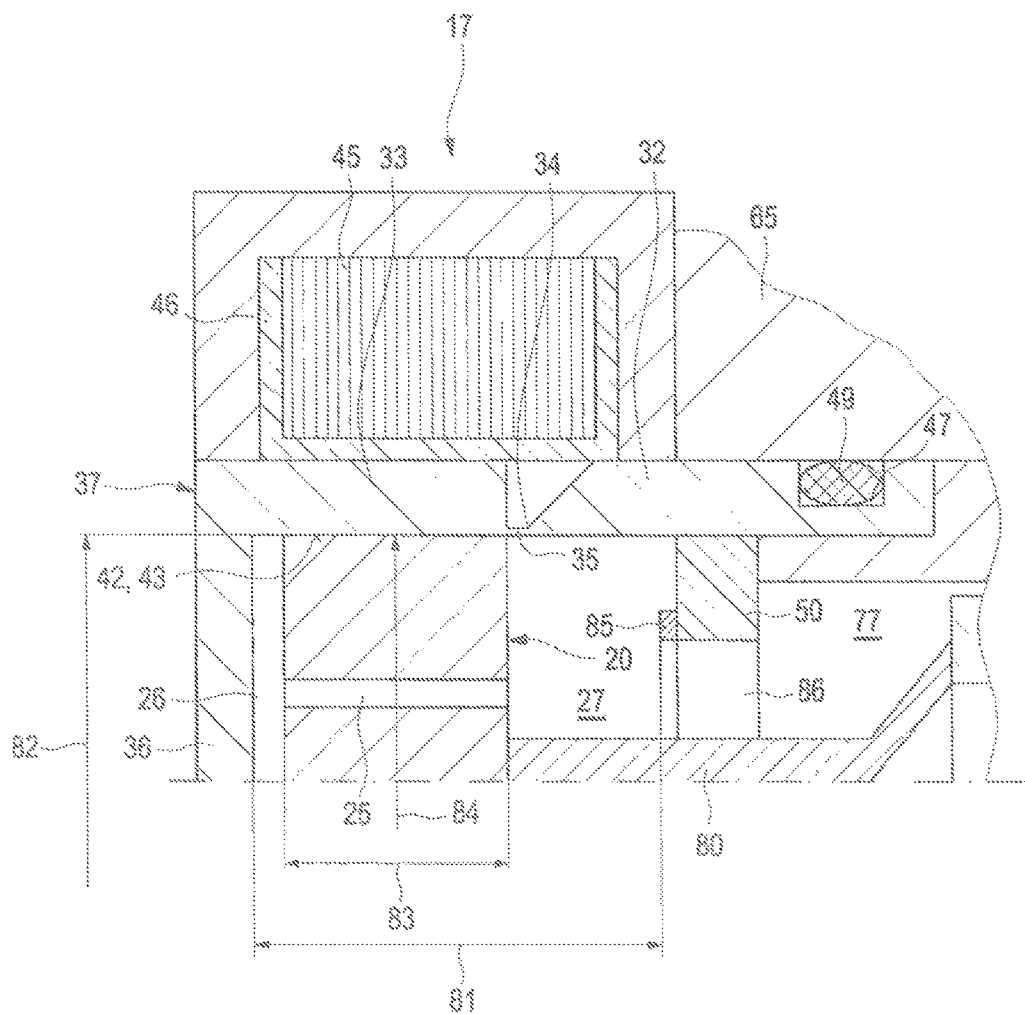
FIG. 3 illustrates a detail of FIG. 2 in an area of the actuator of the hydraulic valve.

FIG. 3 illustrates a detail of FIG. 2 in the portion of the actuator 17. Thus, it is evident that the armature 20 is supported over a length 81 along the second inner running surface 43. Over this length the pole can 37 is fabricated integrally in one piece with a uniform inner diameter 82. The length 81 extends axially over
the pole yoke 33,
a throttling location at the pole yoke 33, and
at least a portion of the pole core cone 32.

The throttling location corresponds to the reduced outer diameter 35.

The armature 20 includes a uniform armature diameter 84 over an armature length 83. The armature 20 is displaceable between two axial stops wherein one stop is formed by the base 36 of the pole can 37 and the other axial stop is formed by an anti-stick disc 85 which contacts the pole core ring 50.

The armature includes a separation layer at its enveloping surface. This separation layer separates the armature 20 from the pole can 37. A coating of this type can be for example nickel-phosphor or chemical nickel. Furthermore Teflon, a sliding lacquer or plasma nitrite coating are feasible. These various coatings can be alternatively applied also on the second inner running surface 43 in order to magnetically separate the armature 20 from the pole can 37. A coating on both sides is possible, however, the alignment errors or coaxial tolerances and thus transversal forces increase with a thickness of the coating. High transversal forces cause a high level of wear or abrasion between the armature 20 and the pole can 37 in addition to low efficiency. A support of this type where the coating forms the separation layer and simultaneously forms the bearing layer over the enveloping surface of the armature is also designated as belly bearing.

In an alternative embodiment additional check valves are provided in the hydraulic valve 12 which facilitates using alternating cam torques for a quick adjustment or an adjustment with low oil pressure. The oil pressure is very small for example when many consumers branch off from the hydraulic loop or when the oil pump is sized very small for reducing fuel consumption. Small torques of this kind can be below 1 bar.

The check valve does not have to be configured as a band shaped check valve which is inserted into an annular groove of the hydraulic valve 12. It is also possible for example to configure the check valve as a ball check valve in a funnel shaped valve seat which is known already from DE 10 2007 012 967 B4.

In an alternative embodiment the pole core ring 50 has an inner diameter that is small relative to its outer diameter. Thus, it is however assured through at least one pass through opening 86 that hydraulic fluid can be exchanged between the spaces 77, 27.

The described embodiments are merely exemplary embodiments. A combination of the described features to obtain different embodiments is also feasible. Additional features of the elements forming part of the invention that are not described can be derived from geometries of the components illustrated in the drawing figures.

REFERENCE NUMERALS AND DESIGNATIONS 1 stator
2 drive wheel
3 stator base element
4 bar
5 intermediary space
6 blade
7 rotor hub
8 rotor 9 first pressure chamber
10 second pressure chamber
11 channel
11' channel
12 hydraulic valve
13 first inner running surface
14 cam phaser
15 hydraulic bushing
16 hollow tube
17 actuator
18 cam shaft
19 piston
20 armature
21 bore hole
22 central axis
23 first rotor channel
24 second rotor channel
25 pass through bore hole
26 first space
27 second space
28 first control groove
29 second control groove
30 third control groove
31 first recess
32 first pole core cone
33 pole yoke
34 cone tip
35 reduced outer diameter
36 base
37 hollow pole element
38 second recess
39 third recess
40 fourth recess
41 fifth recess
42 inside
43 second inner running surface
44 compression coil spring
45 coil
46 coil carrier
47 annular groove
48 shoulder
49 seal element
50 pole core ring
51 first face
52 second face
53 first control edge
54 second control edge
55 third control edge
56 fourth control edge
57 fifth control edge
58 sixth control edge
59 seventh control edge
60 eighth control edge
61 first bar
62 second bar
63 third bar
64 fourth bar
65 valve housing
66 first control edge
67 second control edge
68 third control edge
69 fourth control edge
70 fifth control edge
71 sixth control edge
72 -
73 first gap length
74 second gap length
75 inner space
76 closure
77 third space
78 fourth space
79 check valve
80 support element
81 length
82 inner diameter
83 armature length
84 armature diameter
85 anti-stick disc
86 pass through
A first operating connection
B second operating connection
P supply connection
T1 first tank drain
T2 second tank drain

What is claimed is:

1. A hydraulic valve for a phaser of a cam shaft, the phaser comprising:
    a piston that is supported axially movable along a first inner running surface of a hydraulic bushing of the hydraulic valve and configured to distribute a hydraulic fluid from a supply connection to a first operating connection and a second operating connection that are arranged adjacent to each other,
    wherein the piston is axially movable by an electromagnetically actuatable actuator,
    wherein the electromagnetically actuatable actuator includes a hollow pole element which is configured to receive an armature that is axially movable in the hollow pole element,
    wherein a coil of the electromagnetically actuatable actuator envelops the hollow pole element at least partially so that applying a voltage to the coil causes a magnetic field to move the armature in the actuator,
    wherein the hydraulic bushing that is flowable by the hydraulic fluid is at least configured adjacent to the hollow pole element,
    wherein the hollow pole element has a reduced outer diameter in a portion of the coil so that the hollow pole element is configured as a pole core cone starting from the reduced outer diameter in a direction towards the hydraulic bushing and the hollow pole element is configured as a pole yoke in a direction oriented away from the hydraulic bushing,
    wherein the hydraulic bushing is received in a bore hole of a valve housing of the hydraulic valve,
    wherein the pole core cone includes a seal element in an end portion oriented towards the hydraulic bushing, which seal element seals the bore hole relative to the coil.

2. The hydraulic valve according to claim 1, wherein the seal element is positioned at an enveloping surface of the pole core cone which enveloping surface is arranged oriented towards the valve housing.

3. The hydraulic valve according to claim 1, wherein the pole core cone includes an annular groove configured to receive the seal element.

4. The hydraulic valve according to claim 1, wherein the pole core cone is configured to receive the hydraulic bushing.

5. The hydraulic valve according to claim 4, wherein the hydraulic bushing is inserted into the pole core cone with a press fit.

6. The hydraulic valve according to claim 1, wherein the hydraulic bushing is made from an aluminum material.

7. The hydraulic valve according to claim 1, wherein the hydraulic valve includes the following originating from the inner running surface in an axial sequence:
- a first tank connection configured to run the hydraulic fluid out of the first operating connection,
- the first operating connection configured to run the hydraulic fluid into a first pressure chamber of the phaser,
- the supply connection,
- the second operating connection configured to run the hydraulic fluid into a second pressure chamber of the phaser which second pressure chamber is oriented opposite to the first pressure chamber, and
- a second tank connection configured to run the hydraulic fluid out of the second operating connection,
- wherein the piston includes a first control groove that is associated with the first tank connection and a third control groove that is associated with the second tank connection,
- wherein the first control groove includes a first bar that that defines the first control groove in an axially outward direction, and
- wherein the third control groove includes a fourth bar that that defines the third control groove in an axially outward direction,
- wherein a third space adjacent to the first bar and a fourth space adjacent to the fourth bar is hydraulically separated from
- the first tank connection,
- the first operating connection,
- the supply connection,
- the second operating connection, and
- the second tank connection in any position of the piston,
- wherein an interior space inside the piston connects the third space and the fourth space, and
- wherein the fourth space that is arranged at an end of the hydraulic valve which end is oriented away from the actuator and the third space are closed.

8. The hydraulic valve according to claim 7, wherein the fourth space that is more remote from the actuator is hydraulically closed by a closure.

9. The hydraulic valve according to claim 7,
- wherein the third space that is closer to the actuator is closed by the hollow pole element that adjoins the first inner running surface, and
- wherein the hollow pole element includes a base at an end oriented away from the hydraulic bushing which base closes the third space.

10. The hydraulic valve according to claim 1,
- wherein the hydraulic valve is configured as a cartridge valve, and
- wherein the first inner running surface is provided at an inside of the hydraulic bushing.

11. The hydraulic valve according to claim 1, wherein the piston is a turned component which is supported by a support element at the armature which is supported within the hollow pole element.

12. The hydraulic valve according to claim 1,
- wherein the armature is run over an axial length along a second inner running surface along which the pole can is fabricated integrally in one piece with a uniform inner diameter, and
- wherein the axial length extends axially along
- the pole yoke,
- the reduced outer diameter, and
- at least partially along the pole core cone.

13. The hydraulic valve according to claim 1, wherein the armature has a uniform armature diameter over an axial armature length.

* * * * *